United States Patent [19]

Flaig et al.

[11] Patent Number: 4,541,271

[45] Date of Patent: Sep. 17, 1985

[54] MEASURING ARRANGEMENT FOR CONTINUOUS MONITORING OPERATING PARAMETERS OF AN INTERNAL COMBUSTION ENGINE

[75] Inventors: Ulrich Flaig, Markgröningen; Werner Fischer, Ditzingen; Johannes Locher, Stuttgart; Wolfgang Schmidt, Vaihingen/Enz, all of Fed. Rep. of Germany

[73] Assignee: Robert Bosch GmbH, Stuttgart, Fed. Rep. of Germany

[21] Appl. No.: 551,720

[22] Filed: Nov. 15, 1983

[30] Foreign Application Priority Data

Nov. 16, 1982 [DE] Fed. Rep. of Germany ....... 3242317

[51] Int. Cl.[4] ........................................ G01M 15/00

[52] U.S. Cl. ................................ 73/117.3; 73/119 A

[58] Field of Search .................. 73/119 A, 900, 117.3; 123/486, 488; 323/236

[56] References Cited

U.S. PATENT DOCUMENTS

| | | | |
|---|---|---|---|
| 4,352,158 | 9/1982 | Date et al. | 123/486 X |
| 4,402,294 | 9/1983 | McHugh et al. | 73/119 A X |

*Primary Examiner*—Jerry W. Myracle
*Attorney, Agent, or Firm*—Walter Ottesen

[57] ABSTRACT

The invention is directed to a measuring arrangement for detecting injection-begin in an internal combustion engine equipped with fuel injection valves. The measuring arrangement includes an inductive position transducer controlled by a current source. The current source is regulated against changes in the level of the supply voltage and elements for stabilization against noise impulses on the supply voltage are provided. The operating point of the output transistor of the current source is regulated in response to sharp drops in the level of the supply voltage thereby obtaining an improved signal-to-noise ratio. The output current of the current source is stabilized with respect to noise by elements of a coupling connected between the base of the output transistor and the supply voltage. By controlling the output current of the current source in dependence upon the rotational speed and/or the amplitude of the output signal of the measuring arrangement, it is possible to obtain an injection-begin signal of constant amplitude over the entire range of the rotational speed, temperature, and fabrication tolerances of the sensors.

12 Claims, 7 Drawing Figures

MEASURING ARRANGEMENT FOR CONTINUOUS MONITORING OPERATING PARAMETERS OF AN INTERNAL COMBUSTION ENGINE

BACKGROUND OF THE INVENTION

The invention relates to a measuring arrangement for an internal combustion engine equipped with injection valves. The measuring arrangement detects the beginning of the injection with an inductive position transducer responsive to the nozzle pin. The position transducer is controlled by a current source.

Inductive sensors are known from DE-OS No. 30 32 381 which detect the time changes of an inductive value. FIG. 4 of this publication illustrates a constant current source connected in series with a variable inductance and an inverter is connected to the node connecting the current source to the inductance. After the output signal of the inverter is processed, a comparator detects the beginning of injection.

Current sources used in this manner are disclosed, for example, in the book entitled "Halbleiterschaltungstechnik" of Tietze-Schenk, 4th Edition, page 53. It has been shown especially advantageous to utilize a zener diode for setting the base voltage of the transistor so that the drive of the transistor is substantially independent of small variations in supply voltage.

However, in the relatively rough environment of a motorized vehicle, disadvantages with respect to the known arrangement have become manifest and are discussed below.

This current source operates in an unsatisfactory manner as a consequence of temperature drift of all components of the current source, and especially by low battery voltage as is the case, for example, during the time the motor is started. This causes the transistor of the current source to become fully conductive when the battery voltage falls off to lower values, and all of the noise signals on the supply voltage are evaluated as operating signals.

A further disadvantage is that the amplitudes of the operating signals exhibit a dependency on rotational speed. Because of this, it becomes necessary to equip the comparators used for digital signal processing with rotational speed dependent thresholds in order to prevent larger errors in fixing the time at which fuel injection is to begin. Comparators equipped with such rotational speed dependent thresholds are disclosed, for example, in DE-OS No. 24 49 836.

SUMMARY OF THE INVENTION

It is an object of the invention to provide a measuring arrangement for an internal combustion engine of the kind referred to above wherein the current source is regulated and stabilized against noise in the supply voltage. It is a further object of this invention to provide such a measuring arrangement wherein the amplitude of the operating signal is independent of another system parameter such as rotational speed, for example.

The measuring arrangement of the invention is for an internal combustion engine and continuously monitors operating parameters thereof. The measuring arrangement is supplied by a supply voltage subject to fluctuations in the level thereof and includes: a sensor for providing an analog signal indicative of changes in one of the parameters; and, a current supply arrangement for controlling and supplying current to the sensor. The current supply arrangement includes: current supply means connected to the sensor and operative in its normal dynamic range; and, control means for detecting the fluctuations and controlling the current supply means in response thereto to maintain the same in the normal dynamic range.

According to a further feature of the invention, stabilization means in the form of a coupling device is connected between the supply voltage and the base of a transistor current supply means for applying noise impulses on the supply voltage to the base of said transistor.

The measuring arrangement of the invention has the advantage that a substantially improved signal-to-noise ratio is obtained by utilizing a regulated current source stabilized against supply voltage variations.

In the measuring arrangement described above, variations in another parameter can affect the signal indicative of changes in the one parameter. Accordingly, it is a further feature of the invention to provide means for controlling the current supply means in dependence upon said other parameter.

Thus, it is a further advantage of the invention that the current source is controllable as a function of a parameter such as rotational speed. By suitably dimensioning the control means of the current source, the amplitude of the operating signal can be made independent of rotational speed.

It has been shown to be advantageous to equip the current source with a current limiter in view of problems associated with power loss of the transistor.

BRIEF DESCRIPTION OF THE DRAWING

The invention will now be described with reference to the drawing wherein:

FIG. 2(*b*) is a second embodiment of the control unit of the needle-stroke sensor;

DESCRIPTION OF THE PREFERRED EMBODIMENTS OF THE INVENTION

Figure 1:
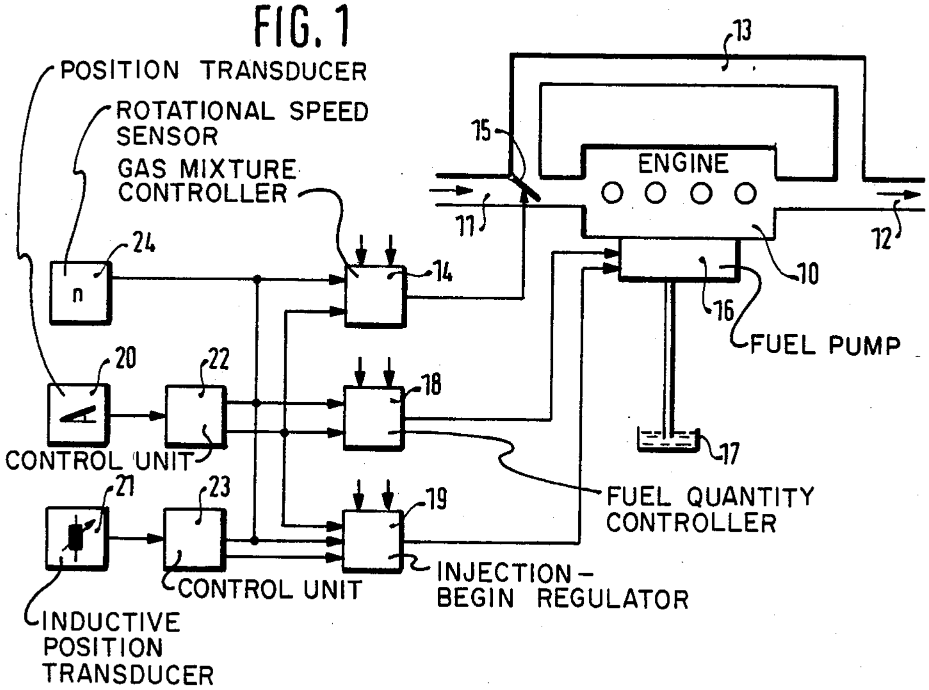
FIG. 1 is a block schematic diagram showing a control arrangement for a diesel engine.

In FIG. 1, reference numeral 10 identifies the internal combustion engine to which are connected an air induction tube 11 and an exhaust gas tube 12. The internal combustion engine 10 is bridged with an exhaust gas return conduit 13 so that the mixture relationship of exhaust gas to fresh air can be adjusted by a gas mixture valve 15, the latter being actuated by a gas mixture controller 14 for controlling the quantity of exhaust gas which is recirculated. The fuel pressure necessary for achieving fuel injection is built up by a pump 16 which is connected at its suction side to tank 14. A fuel quantity controller 18 and an injection-begin controller 19 deliver respective control signals for the pump 16.

The embodiment shown in FIG. 1 includes pick-ups for detecting and receiving measured values which include a rotational speed (rpm) sensor 24, an accelerator pedal position transducer 20, and a needle-stroke sensor 21. The output signals of the accelerator pedal position transducer 20 are processed by a control unit 22 which, in turn, has an output end connected to the following: the gas mixture controller 14 for controlling the gas mixture valve 15; the fuel-quantity controller 18 for controlling the quantity of fuel injected; and, the injection-begin regulator 19. A control unit 23 is connected in cascade with the needle-stroke sensor 21 and delivers the injection-begin signal to the injection-begin regulator 19. The output of the rpm sensor 24 is connected to the following: the gas mixture controller 14; the fuel quantity controller 18; the injection-begin regulator 19; the control unit 23; and, the control unit 22.

It has been shown that the control unit 23 of conventional configuration does not function satisfactorily under all the conditions which occur in a motor vehicle. Accordingly, the invention is directed to obtaining an improvement of the control unit 23 which is shown in greater detail in the embodiments of FIGS. 2(*a*) and 2(*b*).

Figure 2A:
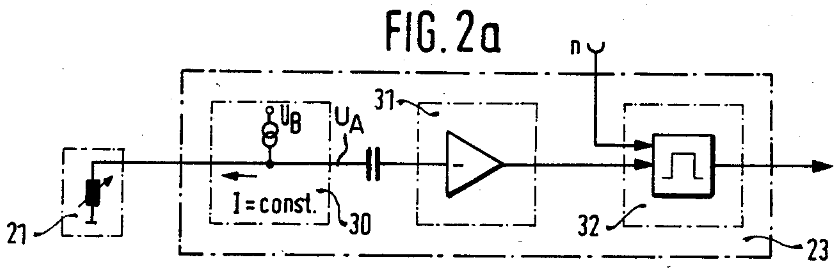
FIG. 2(*a*) is a detailed block diagram of a first embodiment of the control unit of the needle-stroke sensor.
Figure 2B:
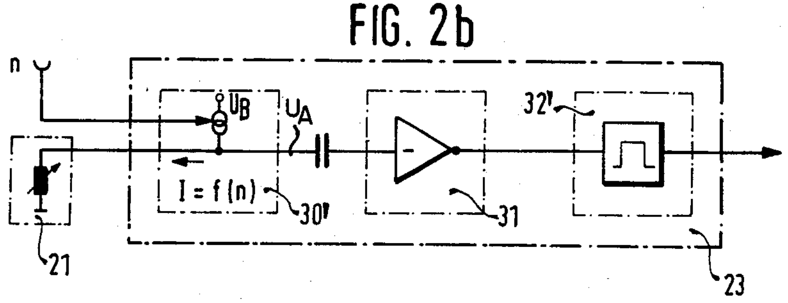

The needle-stroke sensor 21 is configured as an inductive position transducer in both embodiments of FIGS. 2(*a*) and (*b*) and is fed from respective current sources 30 and 30'. The voltage drop occurring at the inductor is capacitively decoupled and is inverted by an amplifier stage 31. This voltage drop is transformed into digital information by means of respective monoflops 32 and 32', each being equipped with a threshold switch. In the ideal situation, the inductive voltage occurring at the needle-stroke sensor 21 should be based on a time-dependent change of the inductivity generated only by the movement of the nozzle needle. However, this requires a constant or only a very slowly changing current flowing through the inductor. This condition is met only in a limited manner with known current sources utilized in motorized vehicle electronic equipment. Particularly in special situations such as when the supply voltage falls off during start up of the internal combustion engine, these unregulated current sources are unable to suppress noise impulses occurring on the supply voltage. These disadvantages are overcome in the embodiment according to the invention shown in FIG. 3.

It is further known that the signal taken off of the inductor has an amplitude which is dependent upon rotational speed. To prevent errors which can result therefrom in the evaluation of injection-begin, a threshold switch dependent upon rotational speed is utilized for monoflop 32 in lieu of a constant threshold value. It is a further feature of the invention to utilize the rpm signal to control the current source 30' [FIG. 2(*b*)] so that the induction signal taken off of the coil of inductive position transducer 21 has an amplitude independent of rotational speed.

To also exclude the amplitude dependence from other parameters such as temperature or to also exclude the effects of variations in sensor manufacturing tolerances, a regulation of the peak values or the mean values of the voltage drop decoupled from the inductor can be obtained. The current source delivers more or less current in dependence upon the value of the decoupled AC voltage in such a manner that the signal amplitude takes on a constant value in spite of variations in the various parameters such as rotational speed, temperature, and sensor manufacturing tolerances. This affords the advantage that by a subsequent transformation of the analog operating signal into digital information, the thresholds of the monoflops 32, 32' can be set to a definite pre-determined value and do not have to be different from one unit to another.

Further, a generalized application of this measuring arrangement is possible which is not directed to the detection of injection-begin. The measuring arrangement can be utilized with all sensors independently of their application, such as sensors for detecting rotational speed, sound, temperature, and flow of a quantity. The sensors themselves can be Hall sensors, inductive sensors, NTC (PTC) sensors, as well as sensors provided with a heat element of constant heat capacity.

Figure 3:
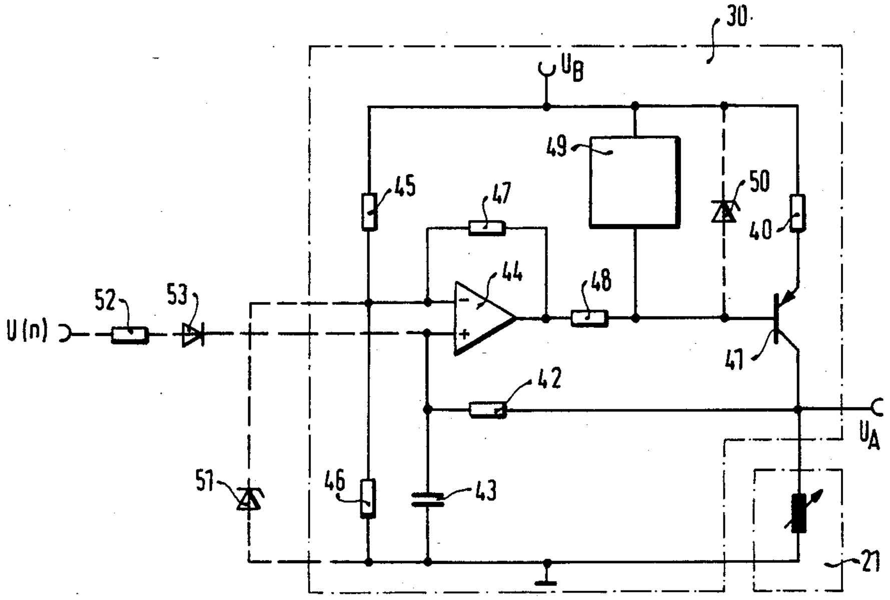
FIG. 3 is a detailed schematic showing an embodiment of the current supply arrangement for supplying current to the needle-stroke sensor; and, FIGS. 4*a*–14*c* illustrate three embodiments of means for stabilizing the current source against noise impulses on the supply voltage.

FIG. 3 is a circuit diagram of the current supply arrangement 30 according to the invention in which a series circuit is connected between the supply voltage $U_B$ and ground. The series circuit includes a resistor 40, a pnp-transistor 41, and the needle-stroke sensor in the form of an inductive position transducer 21. The output voltage $U_A$ at the collector of the transistor 41 is fed to the plus input of an operational amplifier 44 via a low-pass filter consisting of a resistor 42 and a capacitor 43. The minus input of the operational amplifier 44 is connected to the mid-tap of a voltage divider made up of resistors 45 and 46 and to which the supply voltage $U_B$ is connected.

The output signal of the operational amplifier 44 is fed back by a resistor 47 to the minus input thereof and controls the base of transistor 41 via a resistor 48. The base of transistor 41 is connected to the supply voltage $U_B$ via a coupling device 49 which will be described in more detail below.

Further possible embodiments of the current supply arrangement are indicated by the components represented by the broken lines in FIG. 3. Reference numerals 50 and 51 identify zener diodes which can be connected in parallel to the coupling device 49 and/or to resistance 46, respectively. Further, the plus input of the operational amplifier 44 is supplied with a signal dependent on rotational speed via a resistance 52 and a diode 53.

The operation of the circuit of FIG. 3 will now be described.

The DC voltage component of the output voltage $U_A$ is fed back to the plus input of the operational amplifier 44 via the low-pass filter consisting of resistor 42 and capacitor 43. The operational amplifier 44 controls the transistor 41 in such a manner that the voltage $U_A$ at the collector corresponds to the reference voltage at the minus input provided by the voltage divider made up of resistors 45 and 46. For example, if the reference voltage at the minus input of the operational amplifier 44 should drop to a lower value, the transistor 41 will be driven somewhat further into the blocking state region until the voltage $U_A$ again has the same value as the reference voltage. This guarantees that the transistor will not be in the fully conducting state, even in the face of severe drops in supply voltage; instead, the transistor will be operated in its most favorable dynamic range.

A current limiting arrangement is provided for the current source to protect the transistor 41 and the needle-stroke sensor 21 against overload. Zener diode 50 and/or the zener diode 51 are provided for this purpose. Further, it is possible to supply a rotational speed dependent signal to the plus input of the operational amplifier 44 so that the current flowing in the needle-stroke sensor 21 is controlled as a function of the rotational speed.

It has been shown to be useful to insert a coupling device 49 between the base and the emitter of transistor 41 so that noise impulses superimposed on the supply voltage could be applied to the base. As a consequence, noise impulses do not occur at the collector of transistor 41 and a certain and sure processing of the operating signal is guaranteed.

Figure 4A:
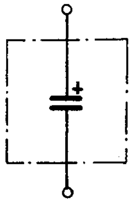
Figure 4B:
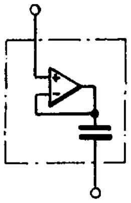
Figure 4C:
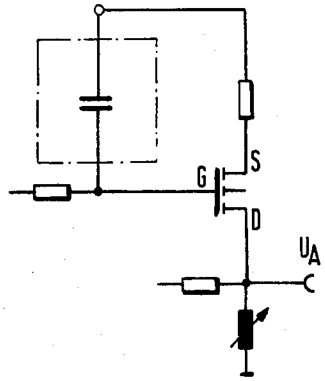

Several embodiments of the coupling device 49 are shown in FIG. 4. In the simplest embodiment shown in FIG. 4(*a*), the coupling device includes a capacitor which has to be of substantial size because of the low impedance of the base, and therefore, the capacitor is preferably an electrolytic capacitor.

In another embodiment of the coupling device shown in FIG. 4(*b*), an operational amplifier driven as an impedance transformer has a capacitor connected to its output. In various applications, it is desirable to utilize operational amplifiers in lieu of electrolytic capacitors because of their high reliability.

If the transistor 41 of FIG. 4(*c*) is configured as a field-effect transistor, then, because of the high impedance of the gate, capacitors can be used for coupling which are small, inexpensive, and are safe with respect to disturbances.

With the aid of the measuring arrangement of the invention for detecting the time of fuel injection, a substantial improvement in the signal-to-noise ratio is obtained. Even in extreme situations which are unpreventable in a motorized vehicle, the measuring arrangement remains reliable in its operation.

Also advantageous is the rotational speed dependent control of the current source with which it is possible to generate an injection-begin signal having an amplitude independent of rotational speed over the entire range of rotational speed of the internal combustion engine. In the case of a regulated AC voltage stabilization of the analog operating signal, the influence of other parameters such as temperature, fabrication tolerances of the sensors and the like are excluded so that the transformation of the operating signal into a digital signal having the same precision is greatly simplified. More specifically, there are no time errors caused by various signal amplitudes with constant trigger thresholds of the monoflops.

It is understood that the foregoing description is that of the preferred embodiments of the invention and that various changes and modifications may be made thereto without departing from the spirit and scope of the invention as defined in the appended claims.

What is claimed is:

1. A measuring arrangement for an internal combustion engine for continuously monitoring operating parameters thereof, the measuring arrangement being supplied by a supply voltage subject to fluctuations in the level thereof and comprising:

a sensor for providing a signal indicative of changes in one of the parameters;

a current supply arrangement for controlling and supplying current to said sensor, the current supply arrangement including:

current supply means connected to said sensor and operating in its normal dynamic range; and, control means for detecting said fluctuations and controlling said current supply means in response thereto to maintain the same in said normal dynamic range whereby an improved signal-to-noise ratio of the output signal at said sensor is obtained.

2. The measuring arrangement of claim 1 wherein variations in another one of said parameters affect said signal indicative of changes in said one parameter, said control means including means for controlling said current supply means as a function of said other one of said parameters whereby said signal at said sensor has an amplitude independent of said other parameter.

3. A measuring arrangement for an internal combustion engine for continuously monitoring operating parameters thereof, the measuring arrangement being supplied by a supply voltage subject to fluctuations in the level thereof and comprising:

a sensor for providing an analog signal indicative of changes in one of the parameters, said signal being affected by variations in another one of said parameters;

a current supply arrangement for controlling and supplying current to said sensor, the current supply arrangement including:

control supply means connected to said sensor and operating in its normal dynamic range;

control means for detecting said fluctuations and controlling said current supply means in response thereto to maintain the same in said normal dynamic range whereby an improved signal-to-noise ratio of the output signal at said sensor is obtained;

said control means including means for controlling said current supply means as a function of said other one of said parameters whereby said analog signal at said sensor has an amplitude independent of said other parameter; and, stabilization means connected between the supply voltage and the input of said current supply means for stabilizing the current flowing through said sensor with respect to noise impulse occurring on the supply voltage.

4. A measuring arrangement for an internal combustion engine for continuously monitoring operating parameters thereof, the measuring arrangement being supplied by a supply voltage subject to fluctuations in the level thereof and comprising:

a sensor for providing a signal indicative of changes in one of the parameters;

transistor current supply means connected to said sensor for supplying current thereto;

circuit means connected to the supply voltage for providing a reference voltage indicative of the level of the supply voltage;

amplifier regulation means including: a first input connected to said circuit means for receiving said reference voltage; a second input connected to the output of said current supply means for receiving a feedback signal indicative of the DC level of voltage at the output of said current supply means; and an output connected to the base of said transistor current supply means for shifting the operating point thereof to maintain said DC level at the same value as said reference voltage; and, parameter circuit means connected to one of said inputs of said amplifier regulation means for supplying an input signal thereto corresponding to another one of said parameters whereby the current flowing through said sensor is controlled as a function of said other parameter.

5. The measuring arrangement of claim 4 wherein noise impulses are superimposed on the supply voltage, the measuring arrangement further comprising: stabilization coupling means connected between said base of said transistor current supply means and the supply voltage for applying the noise impulses to said base thereby stabilizing the output current of said transistor current supply means with respect to said noise impulses.

6. The measuring arrangement of claim 5, said coupling means being a capacitor.

7. The measuring arrangement of claim 5, said coupling means being an electrolytic capacitor.

8. The measuring arrangement of claim 5, said coupling means being an operational amplifier having an output capacitor.

9. The measuring arrangement of claim 5, said transistor current supply means being a field effect transistor, said coupling means being a capacitor having a size consistent with the high input impedance of said transistor.

10. The measuring arrangement of claim 4, said amplifier regulation means being an operartional amplifier having said first and said second inputs, said arrangement further comprising a zener diode connected across said first input to limit the voltage applied thereto to a predetermined value.

11. The measuring arrangement of claim 10 comprising a further zener diode connected across the emitter and said base of said transistor current supply means for limiting the emitter to base voltage to a predetermined value.

12. A measuring arrangement for an internal combustion engine for continuously monitoring operating parameters thereof, the measuring arrangement being supplied by a supply voltage subject to fluctuations in the level thereof and comprising:

a sensor for providing a signal indicative of changes in one of the parameters;

transistor current supply means connected to said sensor for supplying current thereto;

circuit means connected to the supply voltage for providing a reference voltage indicative of the level of the supply voltage;

amplifier regulation means including: a first input connected to said circuit means for receiving said reference voltage; a second input connected to the output of said current supply means for receiving a feedback signal indicative of the DC level of voltage at the output of said current supply means; and an output connected to the base of said transistor current supply means for shifting the operating point thereof to maintain said DC level at the same value as said reference voltage;

an inverter capacitively coupled to said amplifier regulation means; and, monoflop means connected to said inverter for providing a digital signal indicative of changes in said one parameter, said monoflop means including threshold switch means adjustable in dependence upon another one of said parameters.

* * * * *

UNITED STATES PATENT AND TRADEMARK OFFICE

CERTIFICATE OF CORRECTION

PATENT NO. : 4,541,271

DATED : September 17, 1985

INVENTOR(S) : U. Flaig et al

It is certified that error appears in the above-identified patent and that said Letters Patent is hereby corrected as shown below:

In the title of the patent: delete "CONTINUOUS" and substitute -- CONTINUOUSLY -- therefor.

In column 2, line 45: delete "4a-14c" and substitute -- 4a-4c -- therefor.

In column 2, line 62: delete "tank 14." and substitute -- tank 17. -- therefor.

In column 3, line 23: delete "(b)" and substitute -- 2(b) -- therefor.

In column 6, line 17: delete "control supply" and substitute -- current supply -- therefor.

In column 6, line 32: delete "impulse" and substitute -- impulses -- therefor.

In column 7, line 16: delete "operartional" and substitute -- operational -- therefor.

Signed and Sealed this

*Eighth* Day of *July 1986*

[SEAL]

*Attest:*

DONALD J. QUIGG

*Attesting Officer* *Commissioner of Patents and Trademarks*